March 31, 1970
I. J. BELASCO ET AL
3,503,733
METHOD OF INHIBITING NITRIFICATION OF NITROGENOUS FERTILIZERS
Filed March 27, 1967
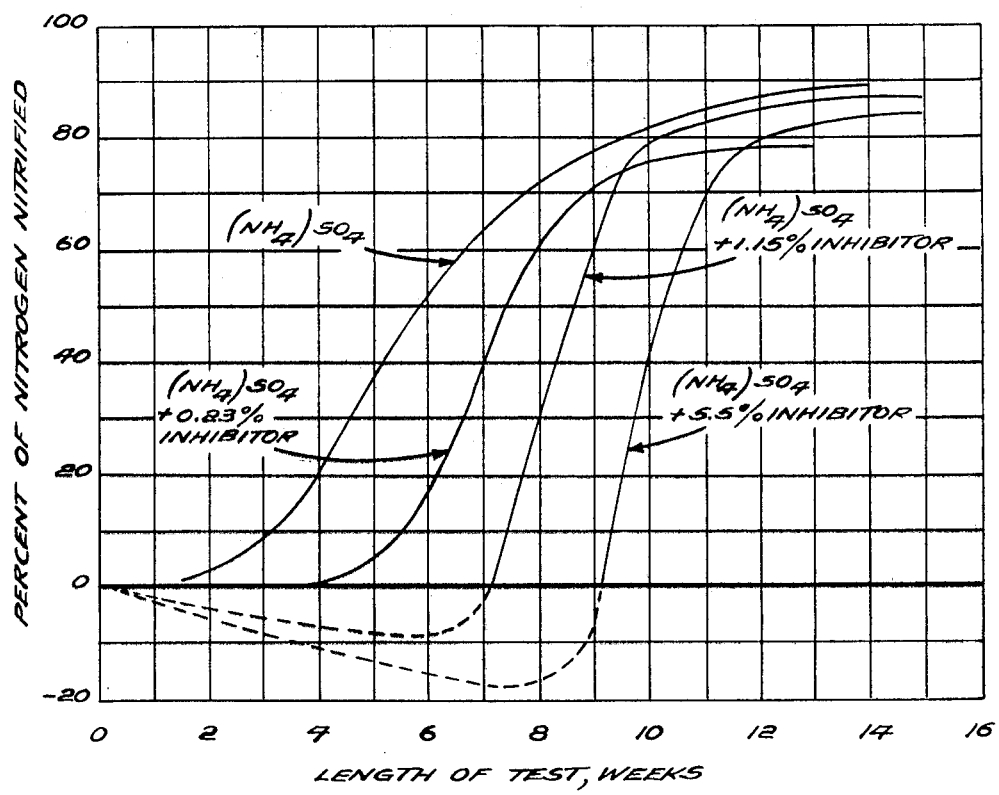
INVENTORS
IRVIN J. BELASCO,
NORMAN R. KOUBA,
BY
Alvin S. Bass
AGENT United States Patent Office 3,503,733
Patented Mar. 31, 1970

3,503,733
METHOD OF INHIBITING NITRIFICATION OF NITROGENOUS FERTILIZERS
Irvin J. Belasco and Norman R. Kouba, Wilmington, Del., assignors to E. I. du Pont de Nemours and Company, Wilmington, Del., a corporation of Delaware
Filed Mar. 27, 1967, Ser. No. 626,210
Int. Cl. A01n 9/20
U.S. Cl. 71—125
2 Claims

ABSTRACT OF THE DISCLOSURE

This invention relates to methods and compositions whereby the nitrification of nitrogenous fertilizers is inhibited utilizing compounds of the 3,3'-hydrocarbonylene bis(tetrahydro-1,3,5-thiadiazine-2-thione) series (symmetrical and unsymmetrical). These nitrification inhibiting compounds may be admixed with nitrogenous fertilizers or later applied to the soil. Typical preferred inhibitors are 3,3' - ethylenebis(tetrahydro - 4,6 - dimethyl - 2H - 1,3,5 - thiadiazine - 2 - thione) and 3,3' - ethylenebis-(tetrahydro - 5 - methyl - 2H - 1,3,5 - thiadiazine - 2 - thione).

BACKGROUND OF THE INVENTION

This invention relates to nitrogenous fertilizers, and more particularly to compositions of which a nitrogenous fertilizer is a component and to methods wherein the rates of nitrification of nitrogenous fertilizers are suppressed or inhibited.

Most plant life receives its nutrition, at least in part, from the nitrogenous constituents of the soil. It is rather important during the life of the plant and especially during the early growth stages to insure that the available nitrogen in the soil is maintained at an effective level. The most usable form of nitrogen in the soil for most plants is the nitrate. Nitrates are the most readily absorbed precursors for the synthetic operations of most plant life. Nitrates are naturally derived from soil components or nitrogenous fertilizers containing nitrogen in a reduced state, by oxidative nitrification by nitrogen fixing bacteria which live in the soil. The nitrification process takes place through the stepwise oxidation of reduced nitrogen, as for example:

$$NH_3 \rightarrow No_2 \rightarrow No_3-$$

The nitrate supply in the soil can be rapidly replenished either by the direct addition of a compound containing the nitrate ion, or through the application of fast release fertilizers, such as inorganic and organic ammonium salts andureas, which contain reduced nitrogen but in a readily oxidizable form.

Unfortunately, the nitrogenous constituents of the soil, in the form of nitrates, are the most readily leached out by moisture ammonia, being held by soil colloids. Nitrates are also removed to the atmosphere by a conversion of the nitrate to nitrogen gas by a process known as denitrification. It can be a very difficult problem to maintain the concentration of nitrates in the soil at a high enough level so as to effectively promote plant growth without multiple fertilizer applications, in a single growing season. It would be highly desirable to be able to enrich the soil in one application with a material which would remain in the soil and slowly release its nitrogen over a growing season, at a fixed or reasonably controllable rate, thereby supplying nitrogen to the crop over a long period as needed.

SUMMARY OF INVENTION

The present invention provides a method whereby the concentration of nitrate in the soil may be maintained at an effective level throughout the growing season with a minimum number of fertilizer applications. This is accomplished through the use of a series of 3,3'-hydrocarbonylene bis(tetrahydro - 1,3,5 - thiadiazine - 2 - thione) (symmetrical and unsymmetrical) which it has been discovered have the property of inhibiting the nitrification of nitrogenous fertilizers. These nitrification inhibiting compounds are applied to the soil either in admixture with a reduced nitrogen fertilizer or in a separate application, as will be more fully described hereinafter.

Many attempts have been made at providing fertilizers which would slowly release nitrogen over a long period of time. Polymeric fertilizers of low solubility are well known as are many types of desolubilizing coatings for fertilizer particles. The art has however sought more convenient and economical means of inhibiting nitrification which could be used in conjunction with ordinary readily available nitrogenous fertilizers. One such method is disclosed in U.S. Patent 3,256,083 to Cleve A. F. Goring utilizing certain N-nitroso compounds.

The 3,3'-hydrocarbonylene bis(tetrahydro-1,3,5-thiadiazine-2-thione) series (symmetrical and unsymmetrical) have been found to be highly effective nitrification inhibitors for a wide variety of nitrogenous fertilizers. Ordinarily with fast release fertilizers such as ammonium salts and ureas, 80 to 90% of the available nitrogen will be converted to nitrate in 3 to 6 weeks from the time of application. The nitrogen needs of most plants increase with increased growth. Through the use of the compounds of the present invention the onset of rapid nitrification can be delayed for from 2 to 10 weeks so that a single fertilizer application at the time of planting can supply an adequate amount of nitrogen to the crop during its period of maximum growth.

BRIEF DESCRIPTION OF THE DRAWING

The drawing graphically represents the retardation of nitrification observed when various amounts of 3,3'-ethylenebis(tetrahydro - 4,6 - dimethyl - 2H - 1,3,5 - thiadiazine - 2 - thione) are added to ammonium sulfate. This test is more fully described in Examples 7–11.

DETAILED DESCRIPTION AND PREFERRED EMBODIMENTS

The nitrification inhibiting compounds of this invention may be represented by the following structural formula:

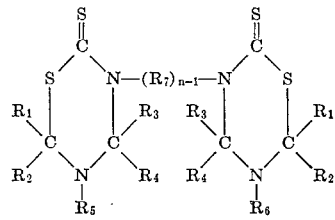

wherein $R_1$, $R_2$, $R_3$ and $R_4$ can be the same or different and are selected from the group consisting of hydrogen and monovalent organic radicals;

$R_5$ and $R_6$ can be the same or different and are selected from the group consisting of hydrogen, sulfo and its salts, hydroxy and monovalent organic radicals;

$R_7$ is a non-aromatic divalent organic radical; and $n$ is a positive integer of less than three, that is, $n$ is 1 or 2.

When $n$ is 1, the heterocyclic rings are of course bonded together directly through the ring nitrogens. By way of illustration but not limitation when $R_1$, $R_2$, $R_3$, $R_4$, $R_5$ and/or $R_6$ are monovalent organic radicals, they can be, for example substituted or unsubstituted alkyl (1–18 carbons) substituted or unsubstituted alkene (2–18 carbons), substituted or unsubstituted aryl, and/or substituted or unsubstituted cycloaliphatic.

Also by way of illustration but not limitation, $R_7$ can be, for example, substituted or unsubstituted alkylene (1–18 carbons) substituted or unsubstituted alkenylene (2–18 carbons) substituted or unsubstituted cycloalkylene, or substituted or unsubstituted alkynylene (2–18 carbons).

It will be understood that the novel symmetrical and unsymmetrical 3,3′-hydrocarbonylene bis(tetrahydro-1,3,5-thiadiazine-2-thione) compounds having the structural formula indicated above can have various substituents within the scope of this invention.

For example, $R_1$ and $R_3$ can be hydrogen and methyl; $R_2$ and $R_4$ substituents are hydrogen, alkyl (1–18 carbons) hydroxy alkyl (1–18 carbons), alkoxy alkyl (2–18 carbons), chloroalkyl (1–18 carbons), carboxy and its salts and esters, carboxyalkyl (2–18 carbons) and their salts alkenyl (2–18 carbons) phenyl, chlorophenyl, nitrophenyl, alkoxyphenyl (7–18 carbons), carboxyphenyl, hydroxyphenyl, nitrochlorophenyl and alkylphenyl (7–18 carbons). ($R_1$ and $R_2$) and ($R_3$ and $R_4$) may be taken together to form a cyclohexyl ring.

Also $R_5$ and $R_6$ substituents within the scope of this invention are hydrogen, cyano, sulfo and its salts, hydroxy, alkenoxy (2–18 carbons) alkoxy (1–18 carbons), amino, alkyl (1–18 carbons), alkylmercaptoalkyl (2–18 carbons), hydroxyalkyl (2–18 carbons), alkoxyalkyl (2–18 carbons), chloroalkyl (2–18 carbons), carboxyalkyl (2–18 carbons) and their salts, carboalkoxyalkyl (3–18 carbons) sulfatealkyl (1–18 carbons) and their salts, sulfoalkyl (1–18 carbons) and their salts, cyanoalkyl (2–18 carbons) phenyl, naphthyl, cyclohexyl, cyclopentyl, chlorophenyl, nitrophenyl (7–18 carbons), chloronitrophenyl, polychlorophenyl, alkoxyphenyl (7–18 carbons) haloalkoxyphenyl (7–18 carbons) dialkylphenyl, benzyl, chlorobenzyl, N-(hydroxyalkyl) aminoalkyl (3–18 carbons) hydroxycarboxyalkyl (2–18 carbons) and their salts, alkylmercaptocarboxyalkyl (3–18 carbons) and their salts, and alkenoxyalkyl (3–18 carbons).

Also $R_7$ moieties are alkylene (1–18 carbons), alkenylene (2–18 carbons), cyclohexylene, hydroxyalkylene (2–18 carbons) alkylenebis (oxyalkyl) (3–18 carbons) alkylnylene (2–18 carbons) carboxyalkylene (3–18 carbons) and their salts, oxydialkyl (2–18 carbons), and alkylcyclohexylene (7–18 carbons).

In the above, it will be understood that the generic terms such as chlorophenyl, chloroalkyl, hydroxyphenyl, hydroxyalkyl and the like, include positional isomers and mono- and poly-substitution.

Preferred compounds within the scope of the above group from the standpoint of overall economics of manufacture and functional properties will be realized when:

$R_1$ and $R_3$ are selected from the group consisting of hydrogen and methyl; $R_2$ and $R_4$ are selected from the group consisting of hydrogen, alkyl of 1–18 carbons, hydroxyalkyl of 1–18 carbons, alkoxyalkyl of 2–18 carbons, chloroalkyl of 1–18 carbons, carboxy, its salts and esters, carboxyalkyl of 2–18 carbons, their salts, alkenyl of 2–18 carbons, phenyl, chlorophenyl, mononitrophenyl, alkoxyphenyl of 7–18 carbons, carboxyphenyl, hydroxyphenyl, (mononitro) chlorophenyl and alkylphenyl of 7–18 carbons, where ($R_1$ and $R_2$) and ($R_3$ and $R_4$) can be taken together to form a cyclohexyl ring; $R_5$ and $R_6$ are selected from the group consisting of hydrogen, cyano, sulfo, sulfo salts, hydroxy, alkenoxy of 2–18 carbons, alkoxy of 1–18 carbons, amino, alkyl of 1–18 carbons, alkylmercaptoalkyl of 2–18 total carbons, hydroxyalkyl of 2–18 carbons, alkoxyalkyl of 2–18 total carbons, chloroalkyl of 2–18 carbons, carboxyalkyl of 2–18 total carbons, their salts, carboalkoxyalkyl of 3–18 total carbons, sulfatealkyl of 1–18 carbons, their salts, sulfoalkyl of 1–18 carbons, their salts, cyanoalkyl of 2–18 carbons, phenyl, naphthyl, cyclohexyl, cyclopentyl, chlorophenyl, mononitrophenyl, alkylphenyl of 7–18 total carbons, chloro (mononitro) phenyl alkoxyphenyl of 7–18 total carbons, haloalkoxyphenyl of 7–18 total carbons, dialkylphenyl, benzyl, chlorobenzyl, N-(hydroxyalkyl) aminoalkyl of 3–18 total carbons, hydroxycarboxyalkyl of 2–18 total carbons, their salts, and alkenoxyalkyl of 3–18 total carbons; $R_7$ is selected from the group consisting of alkylene of 1–18 carbons, alkenylene of 2–18 carbons, cyclohexylene, hydroxyalkylene of 2–18 carbons, alkylenebis (oxyalkyl) of 3–18 total carbons, alkylnylene of 2–18 carbons, carboxyalkylene of 3–18 total carbons, their salts, oxydialkyl of 2–18 total carbons, and alkylcyclohexylene of 7–18 carbons; and $n$ is a positive integer of less than 3.

The two particularly preferred nitrification inhibiting compounds are 3,3′-ethylenebis(tetrahydro-4,6-dimethyl-2H-1,3,5-thiadiazine-2-thione) and 3,3′-ethylenebis(tetrahydro-5-methyl-2H-1,3,5-thiadiazine-2-thione).

The nitrification inhibiting compounds enumerated herein can be prepared by any of a variety of methods known to the art. The preparation of these compounds is described in detail in the patent to Cummins, U.S. Patent No. 3,085,046. As described therein, these compounds can be synthesized by reaction of one molar equivalent of a primary diamine with two molar equivalents of an alkali hydroxide and two molar equivalents of carbon disulfide, followed by addition of the appropriate aldehyde.

These compounds can effectively inhibit the nitrification of any nitrogen containing or potential ammonium ion forming fertilizer components. Examples of such fertilizer components are inorganic ammonium salts such as the nitrates, sulfates and phosphates, organic ammonium salts, ammonia, amines and ureas. The proportion of nitrification inhibitor to fertilizer is not critical and may be adjusted to meet the particular needs of the crop and soil environment. What constitutes an effective nitrification inhibiting amount may vary within wide limits. In general, however, 0.5 to 25% by weight of nitrification inhibitor based on the weight of available nitrogen in the fertilizer component will be employed with one to ten percent being the preferred range.

The nitrification inhibited fertilizer composition of this invention can be prepared by a variety of conventional methods. For example the inhibiting compound may be admixed with the nitrogenous fertilizer component prior to application to the soil. Alternatively the inhibitor can be applied directly to the soil in a separate application. The rate of application of fertilizer to the soil will be substantially unaffected by the presence of the concurrently or separately applied inhibitor. The fertilizer will be applied in a normal effective fertilizing amount for that fertilizer, but what constitutes an effective fertilizing amount will be easily determined by one skilled in the art by conventional methods based on the particular fertilizer and on the needs of the particular soil and crop. The amount of inhibitor compound required for effective nitrification inhibition will be based on the weight of available nitrogen in the fertilizer component as discussed above.

In order that this invention may be better understood the following examples are given:

EXAMPLE I

A solution of 412 parts of the sodium salt of ethylenebisdithiocarbamic acid in 1832 parts of water is prepared in a stirred reactor as described in U.S. 2,693,485. A solution of 270 parts of methylamine hydrochloride in 910 parts of water is added during twenty seconds. After an additional 15 seconds a solution of 240 parts of formaldehyde in 416 parts of water is added during 45 seconds. Product begins to precipitate after about one-half of the formaldehyde solution has been added. The temperature is maintained at 25° to 36° C. by external cooling for an additional two hours. The product is isolated by filtration, washed with water and dried to give 611 parts (95% of theory) of a pure white product, M.P. 185° to 187° C.

This product appears to be very pure 3,3'-ethylenebis (tetrahydro-5-methyl-2H-1,3,5-thiadiazine-2-thione) since material purified by successive crystallizations from nitrobenzene and dimethylsulfoxide melts only one degree higher.

EXAMPLE II

A solution of 128 parts of the sodium salt of ethylene bisdithiocarbamic acid is prepared by adding 76.1 parts of carbon disulfide and a solution of 40 parts of sodium hydroxide in 100 parts of water simultaneously during one hour to a solution of 30 parts of ethylene diamine in 263 parts of water with good agitation while the temperature is maintained below 33° C. by external cooling. After an additional hour, the resulting solution is diluted with 20 parts of water. A solution of 81.5 parts of ethylamine hydrochloride in 200 parts of water is then added during 30 seconds. After an additional 15 seconds a solution of 60 parts of formaldehyde in 104 parts of water is added during thirty seconds. After two hours at 25° to 35° C. the product is isolated by filtration, washed with water and dried. The resulting pure white powder contains a substantial amount of 3,3'-ethylenebis(tetrahydro-5-ethyl-2H-1,3,5-thiadiazine-2-thione).

EXAMPLE III 3,3'-ethylenebis(tetrahydro-4,6-dimethyl-2H-1,3,5-thiadiazine-2-thione) is prepared by following the procedure of Example II, using acetaldehyde and ammonia chloride in place of formaldehyde and ethylamine hydrochloride.

EXAMPLE IV

A mixture containing 0.5% of 3,3'-ethylenebis(tetrahydro-4,6-dimethyl-2H-1,3,5-thiadiazine-2-thione) (I) in urea is prepared by adding 5 parts of (I) to 995 parts of shotted urea, and mixing in a Patterson-Kelly Twin Shell Dry Blender. Blending is continued until a uniform mixture is obtained.

The material is tested for efficacy on corn plants by applying it to an area used for growing corn. The overall test plot is prepared by applying a broadcast application of 369 kg./ha. of 0-14-14 fertilizer to a nitrogen deficient area. The ground is prepared by using conventional procedures for the planting of corn. The above described formulation is applied at the rates of 50 and 100 kg. of nitrogen per hectare to adjacent plots. Control plots are treated in a similar fashion using a similar quantity of untreated shotted urea. The entire area is disked, harrowed, and planted to corn with a single row planter.

The corn germinates and initially grows well in all plots. However, as the season progresses, the corn in the area treated with (I) continues to grow well while that in the control plots grows more slowly. A good yield of corn is obtained from the treated plots.

EXAMPLE V

The procedure is the same as in Example IV above, however, 3,3'-ethylenebis(tetrahydro-5-methyl-2H-1,3,5-thiadiazine-2-thione) is substituted for the 3,3'-ethylenebis (tetrahydro-4,6-dimethyl-2H-1,3,5-thiadiazine-2-thione) in the above example similar results are obtained.

EXAMPLE VI

A mixture containing 2.0% of 3,3'-ethylenebis (tetrahydro-4,6-di-methyl-2H-1,3,5-thiadiazine-2-thione) (I) in urea is prepared by adding 20 parts of (I to 980 parts of shotted urea, and mixing in a Patterson-Kelly Twin Shell Dry Blender. Blending is continued until a uniform mixture is obtained.

This material is tested for efficacy in use on corn as described in Example IV above. Again the area treated with the fertilizing mixture containing the 3,3'-ethylenebis(tetrahydro-4,6-dimethyl-2H-1,3,5-thiadiazine-2-thione) produces thriftier, healthier corn plants than the control and a good yield of corn is obtained.

EXAMPLES 7–11

The effectiveness of these nitrification inhibiting compounds on a fertilizer was demonstrated in the laboratory as follows. 5 groups of Erlenmeyer flasks of 21 flasks each were charged with 100 gms. dry soil, 0.4 gms. $CaCO_3$, 1 gm. inoculant solution and 24.9 gms. of water. The five groups were then separately charged as follows with varying amounts of fertilizer and 3,3'-ethylenebis-(tetrahydro-4,6-dimethyl]-2H-1,3,5-thiadiazine-2 - thione) as inhibitor:

(1) No fertilizer added, (2) 94.5 mgm. $(NH_4)_2SO_4$, (3) 94.5 mgm. $(NH_4)_2SO_4$ and 0.2 mgm. (0.23%) inhibitor, (4) 94.5 mgm. $(NH_4)_2SO_4$ and 1.0 mgm. (1.15%) inhibitor, and (5) 94.5 mgm. $(NH_4)_2SO_4$ and 5.0 mgm. (5.5%) inhibitor. Nitrification is carried out by placing the samples in a 30° C. constant temperature room and maintaining the water content in each flask at a constant level throughout the test. At intervals, three flasks from each series of 21 are removed from the constant temperature room and analyzed for nitrate content by the phenodisulfonic acid method. The net amount of nitrate developed in each series of samples is obtained by subtracting the average amount of nitrate developed in the control samples without fertilizer from that developed in those containing fertilizer. The results are plotted in Figure No. 1 and show that the nitrification of $(NH_4)_2SO_4$ is effectively delayed with 3,3'-ethylenebis(tetrahydro-4,6-dimethyl-2H-1,3,5-thiadiazine-2-thione). Furthermore, the length of the delay is increased by increasing the amount of the inhibitor. Thus, the amount of the inhibitor could be controlled so as to produce a nitrification curve which would closely approximate the nitrogen requirements of growing plants.

It will be understood that the foregoing examples are given for illustrative purposes only and that many other nitrification inhibited fertilizer compositions may be prepared within the scope of this invention in accordance with the particular application. Inhibitor compounds may be selected from those disclosed in U.S. Patent No. 3,085,046 and nitrogenous fertilizers as disclosed above. Further, numerous other minor changes and substitutions may be made without departing from the spirit and scope of the invention which should be limited in no way, other than by the following appended claims.

What is claimed is:

1. The method of fertilizing soil comprising applying to said soil a nitrogenous fertilizer in admixture with a nitrification inhibiting amount of a compound of the formula:

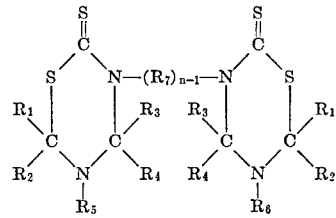

where $R_1$ and $R_3$ are selected from the group consisting of hydrogen and methyl; $R_2$ and $R_4$ are selected from the group consiting of hydrogen, alkyl of 1–18 carbons, hydroxyalkyl of 1–18 carbons, alkoxyalkyl of 2–18 carbons, chloroalkyl of 1–18 carbons, carboxy, its salts and esters, carboxyalkyl of 2–18 carbons, their salts, alkenyl of 2–18 carbons, phenyl, chlorophenyl, mononitrophenyl, alkoxyphenyl of 7–18 carbons, carboxyphenyl, hydroxyphenyl, (mononitro) chlorophenyl and alkylphenyl of 7–18 carbons, where ($R_1$ and $R_2$) and ($R_3$ and $R_4$) can be taken together to form a cyclohexyl ring; $R_5$ and $R_6$ are selected from the group consisting of hydrogen, cyano, sulfo, sulfo salts, hydroxy, alkenoxy of 2–18 carbons, alkoxy of 1–18 carbons, amino alkyl of 1–18 carbons, alkylmercaptoalkyl of 2–18 total carbons, hydroxyalkyl of 2–18 carbons, alkoxyalkyl of 2–18 total carbons, chloroalkyl of 2–18 carbons, carboxyalkyl of 2–18 total carbons, their salts, carboalkoxyalkyl of 3–18 total carbons, sulfatealkyl of 1–18 carbons, their salts, sulfoalkyl of 1–18 carbons, their salts, cyanoalkyl of 2–18 carbons, phenyl, naphthyl, cyclohexyl, cyclopentyl, chlorophenyl, mononitrophenyl, alkylphenyl of 7–18 total carbons, chloro(mononitro) phenyl alkoxyphenyl of 7–18 total carbons haloalkoxyphenyl of 7–18 total carbons, dialkylphenyl, benzyl, chlorobenzyl, N - (hydroxyalkyl) aminolkyl of 3–18 total carbons, hydroxy-carboxyalkyl of 2–18 total carbons, their salts alkylmercapto-carboxyalkyl of 3–18 total carbons, their salts, and alkenoxyalkyl of 3–18 total carbons; $R_7$ is selected from the group consisting of alkylene of 1–18 carbons, alkenylene of 2–18 carbons, cyclohexylene, hydroxyalkylene of 2–18 carbons, alkylenebis (oxyalkyl) of 3–18 total carbons, alkynylene of 2–18 carbons, carboxyalkylene of 3–18 total carbons, their salts, oxydialkyl of 2–18 total carbons, and alkylcyclohexylene of 7–18 carbons, and $n$ is a positive integer of less than three.

2. A method according to claim 1 wherein the nitrogenous fertilizer is ammonium sulfate and the nitrification inhibiting compound is 3,3′-ethylenebis(tetrahydro-4,6-dimethyl-2H-1,3,5-thiadiazine-2-thione).

References Cited

UNITED STATES PATENTS

| | | | |
|---|---|---|---|
| 3,080,364 | 3/1963 | Schroeder | 167—33 X |
| 3,085,046 | 4/1963 | Cummins. | |
| 3,152,124 | 10/1964 | Phillips et al. | 167—33 X |
| 3,284,188 | 11/1966 | Amagasa et al. | 71—54 |
| 3,338,903 | 8/1967 | Harrison | 71—27 |
| 3,373,158 | 3/1968 | Schorr et al. | 260—243 |

OTHER REFERENCES

Kirk and Othmer, Encyclopedia of Chemical Technology, 2 ed., Interscience, New York, vol. 10, p. 221.

HOWARD R. CAINE, Primary Examiner

U.S. Cl. X.R.

71—1, 27, 54